United States Patent [19]

Boehme et al.

[11] 4,207,115

[45] Jun. 10, 1980

[54] INTERNAL SEALANT FOR CONCRETE

[75] Inventors: Werner R. Boehme, Glen Ellyn; Albert J. Schlaeger, Skokie, both of Ill.

[73] Assignee: Fats & Proteins Research Foundation, Inc., Des Plaines, Ill.

[21] Appl. No.: 971,247

[22] Filed: Dec. 20, 1978

[51] Int. Cl.$^2$ .............................................. C04B 37/355
[52] U.S. Cl. ........................................ 106/95; 106/96
[58] Field of Search .................... 106/95, 96, 268, 270

[56] References Cited

U.S. PATENT DOCUMENTS

| 1,076,028 | 10/1913 | Ellis | 106/95 |
| 2,198,776 | 4/1940 | King et al. | 106/96 |
| 3,537,869 | 11/1970 | Proell | 106/95 |

*Primary Examiner*—James Poer
*Attorney, Agent, or Firm*—Trexler, Wolters, Bushnell & Fosse, Ltd.

[57] ABSTRACT

A method and composition are provided for making a finished concrete structure having a water-impervious surface. A particulate composition of a paraffin wax material, glyceryl fatty-acid esters, and stearic or palmitic acid is added to the aggregate phase and mixed in a wet hydraulic Portland cement mixture. The resultant slurry is then poured and cured. The surface of the cured structure is thereafter heated as by solarization under black pigmented polyethylene sheets to cause the wax particles to melt and invade capillary and other interstices in the surface region of the concrete structure, thereby rendering said structure impervious to the infusion of water and water solubles.

7 Claims, No Drawings

INTERNAL SEALANT FOR CONCRETE

BACKGROUND

The present invention relates generally to the preparation of a water-impervious concrete structure and specifically to the economical preparation of roadways, bridge decks, concrete pipe, structural pilings, preformed structures and the like which are desired to be made water-impervious such that water and contained ions do not cause spalling, delamination or other deterioration of the concrete structure.

For example, corrosion of reinforcing steel caused by chlorides from de-icing salt, airborne ocean spray or the like is a major cause of premature deterioration of concrete highways and bridge decks. As rust builds up, the steel expands and cracks the concrete. In dealing with this problem, it has been common practice heretofore to seal the concrete by coating the surface with linseed oil or by adding to the standard Portland cement mixture a small amount of wax beads. In the latter instance, after the concrete has cured, the surface of the roadway or bridge deck is heated to melt the wax beads, thereby sealing the capillary passages normally formed in cured concrete. Beads used in the past have been a blend of paraffin and Montan wax, the Montan wax acting as a wetting agent to facilitate the migration of the wax blend into the capillaries and minute interstices of the cured concrete which are generated by fugitive water in excess of that required for cement hydration. Heating of the concrete surface has been ordinarily accomplished by the use of electric blankets or electric-or-gas-fired infra-red heaters. Since the melting point of the paraffin/Montan wax blend is in excess of 75° C., the surface must be heated to at least 85° C. and to as much as 212° C. and to a depth of about two inches in order to insure complete migration of the wax into the capillaries and achieve concomitant internal sealing of the concrete structure.

Substantial problems exist with respect to the internal sealing methods and compositions heretofore employed. Due to the high temperature needed to cause migration of the paraffin/Montan wax composition, requisite equipment must be purchased, transported from work site to work site, and maintained, in order to complete the sealing of concrete surfaces, all at considerable expense. In addition, the high heat employed and resultant localized, differential thermal expansion may cause cracking of the adjoining unheated concrete unless suitable temperature gradients are established.

The present invention overcomes these problems and achieves other advantages not found in the prior art by the replacement of the Montan wax with animal byproducts, combining high wetting ability, low melting point, low melt viscosity, and low cost. Specifically, the advantages of the present invention include:

(1.) low total cost due to the low raw material cost and low labor and energy costs resulting from short heat-treating times and a comparatively low temperature necessary to effect complete sealing of the concrete;

(2.) improved sealing due to the complete chloride blockage;

(3.) improved strength due to the low additive concentration; and (4.) a reduced danger of structural damage due to low thermal stress in heating and cooling.

DESCRIPTION OF THE PREFERRED EMBODIMENTS

The present invention contemplates the replacement of the twenty-five percent Montan wax wetting agent currently used in internal concrete sealant compositions with animal byproducts to achieve low cost and other advantages. A mixture of hydrogenated tallow and commercial stearic acid has proved to be an eminently suitable wetting agent for both paraffin and slack waxes. A specific system comprising, by weight, five percent commercial stearic acid, twenty percent hydrogenated tallow, and seventy-five percent paraffin (referred to generally as STP) provides maximum concrete wetting efficiency while offering the distinct advantages of low melting point, high polarity, low melt viscosity and low cost.

The paraffin wax materials in the practice of the present invention are primarily those solid members of the methane series having boiling points in excess of 300° C. Ordinarily, commercial refined paraffin waxes, or slack waxes containing impurities and oils, are most economically used. Examples of such commercial products used in the trade are Boron R 152, Union SR-143, and Whitco 128-30.

Animal by-products which constitute a cooperating basis for the novel wetting agents of the instant invention include naturally occurring fatty acid esters such as lard, tallow, and the like. These products result from the esterification of a trihydroxy alcohol with such complex acids as palmitic, stearic and oleic acids. The hydrogenated derivatives of such esters are also eminently suitable for the practice of the present invention.

Additional wetting agents which may be advantageously used are fatty acids obtained by the saponification of animal fats and tallows and include the mixed stearic and palmitic acid of commerce, as well as palmitic and oleic acids and the like.

Hardness and abrasion resistance tests were made on the STP blends of the present invention, and the results were compared with similar tests made on the prior art parafin/Montan system. The abrasion tests were performed by tumbling aggregates with carefully weighed discs of the respective wax blends in a ball mill and measuring the abraded weight loss of the wax as a function of time. This abrasion weight loss is important because the wax which is "lost" acts to coat the aggregate surfaces on mixing and tends to prevent subsequent cement bonding. Reduced cement bonding decreases the strength of the cured product. While it is not known what weight loss is actually critical for a given slurry composition, results of these tests indicate that weight losses in the STP compositions of the invention are similar to those of the Montan/paraffin product.

The instant STP beads are manufactured by mixing and heating the blended materials, and pumping the resultant composition through a centrifugal spray nozzle. Air is injected into the feed line to produce a small central void in each bead. The present STP compositions, at a temperature of the melting point thereof plus about five degrees centigrade, were pumped through a 1/32" nozzle aperture at pressures of from 18 to 40 p.s.i. to produce beads of a size of 70–80 mesh. These beads were cooled sufficiently by a 10–12' free fall through 23° C. air so that no agglomeration or sintering occurred upon settling.

Furthermore, the instant STP beads have been produced from a composition of 5% commercial stearic acid, 20% hydrogenated tallow, and 75% paraffin wax material utilizing two different paraffin waxes, the first being a highly refined product having a melting point of 150° F. and the other being of the slack wax type having a melting point of 133° F. The resultant commercial stearic acid, hydrogenated tallow and paraffin wax compositions are hereinafter identified with reference to these melting points as STP 150 and STP 133 respectively.

EXAMPLES 1 through 6

Concrete mixes were prepared with five internal sealant variables and an unsealed control, as set forth in Table I below. All aggregates were first screened and examined for size distribution; and the same proportions were used in each mix. The coarse aggregate (crushed limestone) was AASHO M43, size 67. The concrete sand had a consistent fineness modulus (a measure of particle size distribution) of 2.70 in all mixes. The cement used was from one lot (one day's production) of the Southwestern Portland Cement Company.

TABLE I

| Example No. | Mix. Size | Bead Composition | Bead Concentration (By Weight) |
|---|---|---|---|
| 1 | 2.0 cu. ft. | none (control) | none |
| 2 | 2.0 cu. ft. | 25% Montan/75% paraffin 150 | 3% |
| 3 | 2.7 cu. ft. | STP 150 | 2% |
| 4 | 2.7 cu. ft. | STP 133 | 2% |
| 5 | 2.7 cu. ft. | STP 150 | 3% |
| 6 | 2.7 cu. ft. | STP 133 | 3% |

The sealant beads were rapidly and uniformly distributed in each mix using conventional rotating drum mixing equipment. A total mixing time of 30 minutes was used for all batches, but visual examination indicated that complete mixing was achieved in about 2 minutes.

As is well known, the mobility or formability of concrete, measured as slump (the distance a 12-inch truncated cone of fresh concrete sags when the supporting cone is removed), is primarily related to the water content. It is also, to a lesser extent, a function of the aggregate particle shape. Replacement of some of the angular sand and stone with spherical beads in the mixes of Examples 2-6 improved the workability and forming characteristics of the wet concrete. This desirable effect was slight with the Montan/paraffin beads, but more pronounced with the STP beads of the present invention.

In addition, this lubrication property enhances the ease in placement and finishing of wet concrete without increasing the water content and concomitantly decreasing the strength of the cured concrete structure.

Specimens were prepared from the wet mixes of Examples 1-6; and these were allowed to cure under standard conditions and thereafter heat treated to cause infusion of the sealant compositions. The specimens used were one-inch discs cut from 3-inch diameter cylinders. Two specimens each, taken from two different cylinders were used for each of the heat treating temperatures.

Table II below shows the selected heat treating temperature at 5° C. intervals from the melting point plus 5° C. to the melting point plus 15° C. The softening range was noted as the first appearance of a translucent layer on a one gram sample of the additive.

TABLE II

| System | Softening Range | Melting Point | Heat Treating Temperatures | | |
|---|---|---|---|---|---|
| STP$_{133}$ | 49°-52° C. | 52° C. | 57° C. | 62° C. | 67° C. |
| STP$_{150}$ | 57°-60° C. | 60° C. | 65° C. | 70° C. | 75° C. |
| Montan/Paraffin | 72°-78° C. | 75°-78° C. | | 85° C. | |

Heat treating was done in a proportional air circulating oven. The specimens were heated slowly from ambient to the designated temperature over one hour and then held at temperature for one hour. These studies showed that the optimal heat-treating temperature for the STP bead systems of the present invention is about the respective melting point plus 10° C. or approximately 70° C. for the STP 150 and 62° C. for the STP 133. In addition, the STP 133 composition shows maximum infusion or sealing effect even at a temperature as low as 57° C. By comparison, at 5° C. below its designated heat-treating temperature of 85° C. the Montan/paraffin beads showed little flow and only marginal sealing effect. Thus, the STP systems can be activated into sealant condition by mere solarization, i.e. exposure to the sun's heat under a black-pigmented polyethylene film, without resort to such artificial heat sources as electric blankets.

Specimens of Examples 1-6 were exposed to total immersion in a water bath environment; and the absorbed water was monitored as weight increases in regular intervals over seven days. At each interval, the instant STP sealed specimens, regardless of the sealant concentration, absorbed less water than the Montan/paraffin specimen of Example 2. In particular, specimens of Example 4 containing 2% of the low cost STP 133 composition absorbed approximately 30% less water than those containing the Montan/paraffin beads, even when heated to 57° C., five degrees less than the optimum heat treating temperature for that STP composition.

Chloride blockage in the sealed concrete was determined by ponding a three percent sodium chloride solution onto samples of each of the specimens for periods of up to ninety days, and then by analyzing for the chloride content, using $HNO_3$ digestion and potentiometric titration with $AgNO_3$. The specimens were first air dried and then samples were taken at depths of ½ inch, 1 inch and 1½ inches. No sealed concrete absorbed any significant amount of chloride in this test. However, the 2% concentration of low cost STP 133 system of Example 4 completely blocked all chloride penetration, indicating that this system was as effective as the Montan/paraffin system of Example 2, even at one-third lower concentration.

Table III shows the compressive strengths of sealed concrete cylinders, according to Examples 1-6, all of which are within the minimum requirements of most highway departments.

TABLE III

| Sealant Material | Specific Gravity (lbs./cu.ft.) | Compressive Strength, p.s.i. | | |
|---|---|---|---|---|
| | | 7 days* | 30 days | 90 days |
| none (control) | 145.4 | 5050 | 5310 | 5300 |
| 3% Montan/Paraffin 150 | 137.9 | 4130 | 4420 | 4600 |
| 2% STP 150 | 139.4 | 4180 | 5150 | 5100 |
| 2% STP 133 | 139.7 | 4060 | 5020 | 5140 |
| 3% STP 150 | 137.7 | 4080 | 4510 | 4700 |

TABLE III-continued

| Sealant Material | Specific Gravity (lbs./cu.ft.) | Compressive Strength, p.s.i. | | |
|---|---|---|---|---|
| | | 7 days* | 30 days | 90 days |
| 3% STP 133 | 135.6 | 3710 | 4610 | 4670 |

*Specimens not heat treated

The effect of the STP beads on compression strength is essentially similar to that of the Montan/paraffin system at like concentrations. In both cases, the bead effect is about the same as that of entrained air voids of equal volume. Compressive strengths for all 3% sealed specimens ranged from 4600 to 4700 p.s.i. after ninety days and were well above the required 3000 p.s.i. after thirty days cure. While all STP sealed specimens showed marginally higher strengths (after ninety days) than the Montan/paraffin ones, the difference was slight and within experimental error.

The most significant data are those for Examples 3 and 4, which contained only 2% STP beads. These had significantly higher compressive strengths than any other sealed specimens. Past work with both sealed and air-entrained concrete has indicated that the negative effect of wax beads or entrained air voids on the compressive strength increases exponentially with volume. Thus, large increases in strength can be realized by small decreases in bead volume. Since the STP 133 beads of the present invention can effectively seal concrete at lower concentrations, these beads provide meaningfully higher concrete strengths.

Use of the compositions of the present invention also provides an one-third to one-half savings in the heat required for activation as compared with the Montan wax blends.

The specific examples herein shown and described are to be considered primarily illustrative. Various changes beyond those described will, no doubt, occur to those skilled in the art; and these changes are to be understood as forming a part of this invention insofar as they fall within the spirit and scope of the appended claims.

The invention is claimed as follows:

1. The method of making a finished concrete structure having a water-impervious surface, which method comprises the steps of: preparing a composition of at least one glyceryl fatty acid ester and a paraffin wax material composed primarily of solid members of the methane series with boiling points in excess of 300° C.; dispersing a quantity of said composition sufficient to afford waterproofing effects in a wet hydraulic Portland cement slurry to form a mixture; pouring the resultant mixture to the desired form of a finished concrete structure; allowing said mixture to hydrate and harden; and heating the surface region of said concrete structure to a temperature below 85° C. and above the melting point of said composition whereby to cause the wax material to melt and fill the capillary interstices in said structure.

2. the method according to claim 1 wherein said glyceryl fatty acid ester is hydrogenated tallow.

3. The method according to claim 1 which further comprises the step of incorporating in said composition stearic acid.

4. The method according to claim 1 which further comprises the step of incorporating in said composition palmitic acid.

5. The method according to claim 1 which further comprises the step of incorporating in said composition oleic acid.

6. The method according to claim 1 wherein said heating is accomplished by covering the structure with a heat absorbent film whereby radiant solar energy is absorbed and transmitted to the surface of said structure.

7. The method according to claim 6 wherein said film is black pigmented polyethylene.

* * * * *